United States Patent
Guim Bernat et al.

(10) Patent No.: US 12,038,861 B2
(45) Date of Patent: *Jul. 16, 2024

(54) SYSTEM DECODER FOR TRAINING ACCELERATORS

(71) Applicant: Intel Corporation, Santa Clara, CA (US)

(72) Inventors: Francesc Guim Bernat, Barcelona (ES); Da-Ming Chiang, San Jose, CA (US); Kshitij A. Doshi, Tempe, AZ (US); Suraj Prabhakaran, Aachen (DE); Mark A. Schmisseur, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,268

(22) Filed: Oct. 25, 2022

(65) Prior Publication Data
US 2023/0039631 A1 Feb. 9, 2023

Related U.S. Application Data

(63) Continuation of application No. 17/584,092, filed on Jan. 25, 2022, now Pat. No. 11,586,575, which is a
(Continued)

(51) Int. Cl.
*G06F 13/40* (2006.01)
*G06F 9/455* (2018.01)
(Continued)

(52) U.S. Cl.
CPC ...... *G06F 13/4068* (2013.01); *G06F 9/45533* (2013.01); *G06F 9/5027* (2013.01);
(Continued)

(58) Field of Classification Search
None
See application file for complete search history.

(56) References Cited

U.S. PATENT DOCUMENTS

| 7,664,931 | B2 * | 2/2010 | Erforth | G01C 21/36 |
| | | | | 712/42 |
| 8,738,860 | B1 | 5/2014 | Griffin et al. | |

(Continued)

OTHER PUBLICATIONS

Notice of Allowance for U.S. Appl. No. 15/848,218, dated Oct. 29, 2021.
(Continued)

*Primary Examiner* — Michael Sun
(74) *Attorney, Agent, or Firm* — Essential Patents Group, LLP; Christopher K. Gagne

(57) ABSTRACT

There is disclosed an example of an artificial intelligence (AI) system, including: a first hardware platform; a fabric interface configured to communicatively couple the first hardware platform to a second hardware platform; a processor hosted on the first hardware platform and programmed to operate on an AI problem; and a first training accelerator, including: an accelerator hardware; a platform inter-chip link (ICL) configured to communicatively couple the first training accelerator to a second training accelerator on the first hardware platform without aid of the processor; a fabric ICL to communicatively couple the first training accelerator to a third training accelerator on a second hardware platform without aid of the processor; and a system decoder configured to operate the fabric ICL and platform ICL to share data of the accelerator hardware between the first training accelerator and second and third training accelerators without aid of the processor.

18 Claims, 7 Drawing Sheets

Related U.S. Application Data continuation of application No. 17/125,439, filed on Dec. 17, 2020, now Pat. No. 11,269,801, which is a continuation of application No. 15/848,218, filed on Dec. 20, 2017, now Pat. No. 11,263,162.

(51) Int. Cl.
| | |
|---|---|
| *G06F 9/50* | (2006.01) |
| *G06F 9/54* | (2006.01) |
| *G06F 13/362* | (2006.01) |
| *G06F 13/42* | (2006.01) |
| *G06N 3/02* | (2006.01) |
| *G06N 3/04* | (2023.01) |
| *G06N 3/045* | (2023.01) |
| *G06N 3/08* | (2023.01) |

(52) U.S. Cl.
CPC .............. *G06F 9/54* (2013.01); *G06F 13/362* (2013.01); *G06F 13/4265* (2013.01); *G06F 13/4282* (2013.01); *G06N 3/02* (2013.01); *G06N 3/04* (2013.01); *G06N 3/045* (2023.01); *G06N 3/08* (2013.01); *G06F 2213/0026* (2013.01)

(56) References Cited

U.S. PATENT DOCUMENTS

| | | | |
|---|---|---|---|
| 10,310,760 B1* | 6/2019 | Dreier | G06F 13/42 |
| 11,216,314 B2* | 1/2022 | Harwood | G06F 9/4856 |
| 11,282,161 B2 | 3/2022 | Ray et al. | |
| 11,315,013 B2* | 4/2022 | Savic | G06F 9/45541 |
| 2006/0031447 A1 | 2/2006 | Holt et al. | |
| 2017/0213154 A1 | 7/2017 | Hammond et al. | |
| 2019/0069437 A1 | 2/2019 | Adrian et al. | |
| 2019/0102311 A1 | 4/2019 | Gupta et al. | |
| 2019/0205745 A1 | 7/2019 | Sridharan et al. | |
| 2019/0286972 A1* | 9/2019 | El Husseini | G06N 3/063 |
| 2019/0312772 A1* | 10/2019 | Zhao | G06F 9/5011 |
| 2020/0311559 A1 | 10/2020 | Chattopadhyay et al. | |
| 2023/0094125 A1* | 3/2023 | Rogers | G06F 21/53 |
| | | | 713/190 |

OTHER PUBLICATIONS

Notice of Allowance for U.S. Appl. No. 17/125,439, dated Nov. 1, 2021.
Office Action for U.S. Appl. No. 15/848,218, dated Jun. 24, 2021.
Cutress, Ian, "NVIDIA's DGX-2: Sixteen Tesla V100s, 30 TB of NVMe, only $400K", Anandtech, Mar. 27, 2018, retrieved online via https://www.anandtech.com/show/12587/nvidias-dgx2-sixteen-v100-gpus-30-tb-of-nvme-only-400k, 4 pages.
Gomperts, et al., "Development and implementation of parameterized FPGA-based general purpose neural networks for online applications", IEEE Transactions on Industrial Informatics 7.1: 78-89 (year: 2010).
Intel, "Accelerate Your Data Center with Intel FPGAs", Solution Brief, Cloud Service Providers, Intel FPGAs; Case Study; 3 pages.
Intel Corp., "Intel FPGA Programmable Accelaration Card (Intel", Platform Selector Guide, 1 page.
Intel Corp., "Intel FPGA Programmable Acceleration Card (PAC) D5005", Product Brief; 1 page.
Intel Corp., "Intel FPGA Programmable Acceleration Card (PAC) D5005", ss-1088-1.0; 1 page.
Intel Corp., "Intel FPGA Programmable Acceleration CArd D5005", retrieved online via https://www.intel.com/content/www/us/en/programmable/products/boards_and_kits/dev-kits/altera/intel-fpga-pac-d5005/overview.html; 2 pages.
Intel Corp., "Intel OpenVINO with FPGA Support Through the Intel FPGA Deep Learning Acceleration Suite", Intel FPGA Deep Learning Acceleration Suite enables Intel FPGAs for accelarated AI optimized for performance, power and cost; Solution Brief.
Intel Corp., "Intel Programmable Accelaration Card (Intel PAC) with Intel Arria 10 GX FPGAs", Product Brief; 1 page.
Intel Corp., "Intel Xeon Scalable Platform", The Future-Forward Platform Foundation for Agile Digital Services; Product Brief; Intel Corporation; 2017, 14 pages.
Microway, "Detailed Specifications of the "Skylake-SP" Intel Xeon Processor Scalable Family CPUs", retrieved online via https://www.microway.com/knowledge-center-articles/detailed-specifications-of-the-skylake-sp-intel-xeon-processor-scalable-family-cpus; 24 pages.
NVIDIA, "NVIDIA A100 Tensor Core GPU Architecuture Unprecedented Acceleration at Every Scale", NVIDIA Corporation, white paper, 2020, 83 pages.
NVIDIA, "NVIDIA DGX A100 The Universal System for AI Infrastructure", NVIDIA Corporation, NVIDIA DGX A100, Data Sheet, May 2020, 2 pages.
NVIDIA, "NVIDIA DGX-1 Deep Learning System", DGX-1 Data Sheet Apr. 2016.
NVIDIA, "NVIDIA DGX-1 With Tesla V100 System Architecture The Fastest Platform for Deep Learning", www.nvidia.com; White Paper; WP-08437-002_v01, 2017, 40 pages.
Oh, Nate, "NVIDIA Ships First Volta-based DGX Systems", ANANDTech, Sep. 7, 2017; retrieved online via https://www.anandtech.com/show/11824/nvidia-ships-first-volta-dgx-systems, 3 pages.
Saliou, et al., "Analysis of Firewall Performance Variation to Identify the Limits of Automated Network Reconfigurations", ECIW2006, 2006, pp. 1-11.
Smith, R., et al., "NVIDIA Unveils the DGX-1 HPC Server: 8 Teslas, 3U, Q2 2016", Anandtech, Apr. 6, 2016. Retrieved online via https://www.anandtech.com/show/10229/nvidia-announces-dgx1-server, 7 pages.
Wu, "Programming Models' Support for Heterogeneous Architecture", Doctoral Thesis, University of Tennessee, 2017.
Notice of Allowance for U.S. Appl. No. 17/584,092, dated Oct. 14, 2022.

* cited by examiner

SYSTEM DECODER FOR TRAINING ACCELERATORS

CLAIM FOR PRIORITY

This application is a continuation of co-pending U.S. patent application Ser. No. 17/584,092, filed on Jan. 25, 2022, entitled "System Decoder for Training Accelerators", which is a continuation of prior U.S. patent application Ser. No. 17/125,439, filed on Dec. 17, 2020, entitled "System Decoder for Training Accelerators", now issued as U.S. Pat. No. 11,269,801, which is a continuation of prior U.S. patent application Ser. No. 15/848,218, filed on Dec. 20, 2017, entitled "System Decoder for Training Accelerators", now issued as U.S. Pat. No. 11,263,162. Each of these prior applications is hereby incorporated herein by reference in its entirety.

FIELD OF THE SPECIFICATION

This disclosure relates in general to the field of network computing, and more particularly, though not exclusively, to a system and method for a system decoder for training accelerators.

BACKGROUND

In some modern data centers, the function of a device or appliance may not be tied to a specific, fixed hardware configuration. Rather, processing, memory, storage, and accelerator functions may in some cases be aggregated from different locations to form a virtual "composite node." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
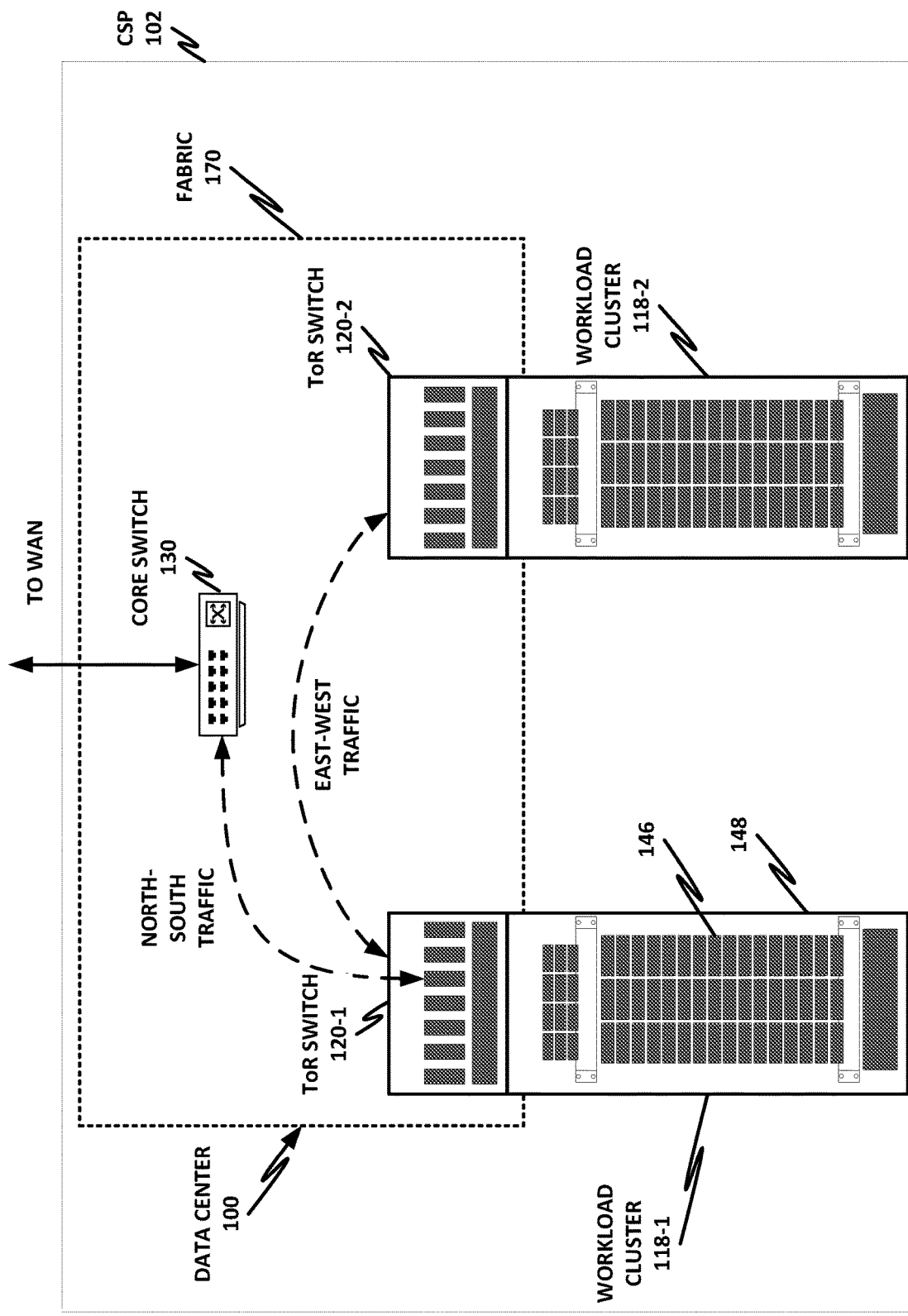
FIG. 1 is a block diagram of selected components of a data center with network connectivity, according to one or more examples of the present application.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

A contemporary computing platform, such as a hardware platform provided by Intel® or similar, may include a capability for monitoring device performance and making decisions about resource provisioning. For example, in a large data center such as may be provided by a cloud service provider (CSP), the hardware platform may include rack-mounted servers with compute resources such as processors, memory, storage pools, accelerators, and other similar resources. As used herein, "cloud computing" includes network-connected computing resources and technology that enables ubiquitous (often worldwide) access to data, resources, and/or technology. Cloud resources are generally characterized by great flexibility to dynamically assign resources according to current workloads and needs. This can be accomplished, for example, via virtualization, wherein resources such as hardware, storage, and networks are provided to a virtual machine (VM) via a software abstraction layer, and/or containerization, wherein instances of network functions are provided in "containers" that are separated from one another, but that share underlying operating system, memory, and driver resources.

Deep learning algorithms, or so-called "artificial intelligence" (AI) is an important contemporary computing problem. Artificial intelligence systems employing, for example, convolutional neural networks (CNNs) are used for contemporary computing problems such as searching large data sets, classifying documents, computer vision, self-operating machinery (including self-driving cars), and many others.

Such deep learning algorithms often involve a multistage process, including a training phase wherein the artificial intelligence model is trained with a pre-seeded data set, and an operational phase wherein it performs its work. The training phase need not be a discrete phase that occurs before the operational phase, but in some cases can be a continuous process in which the CNN continues to receive feedback and additional training data so that it can further refine its processes. The CNN itself is often employed in a highly distributed fashion, such as in a high-performance computing (HPC) cluster, or in a large data center, such as may be operated by a cloud service provider (CSP). A large number of compute nodes can work on the artificial intelligence problem in parallel, and thus produce valuable results in useful time periods.

Operators of such neural networks may need to run very large-scale training tasks for their deep learning problem sets. In some cases, a hardware acceleration solution (such as Intel® Lake Crest) may be used to provide acceleration of the training problem. The hardware accelerator could include a coprocessor, a field-programmable gate array (FPGA), an application-specific integrated circuit (ASIC), a graphics processing unit (GPU), firmware, or other accelerated computing devices. The operator of the neural network may need to be able to bring together many accelerators in a flexible and transparent way so that communication among the accelerators does not become cumbersome for the solution itself.

Some existing systems use scale-out AI accelerators, such as GPUs. In these architectures, coordination between accelerators may be done at the software level. Data may need to be given to accelerators, the accelerators compute their results, and then results are moved from accelerators into system memory, and from there are distributed among different scale-out nodes, and then to the accelerators attached to those nodes. Thus, for the various accelerators in an AI system to communicate with one another, there may be multiple levels of passing data from accelerator to processor, from processor to processor, and then from processor to another accelerator. This can include cache operations, main memory accesses, and other memory operations that can substantially slow the operation of the accelerators. Furthermore, the software involved in moving these data around introduces overhead to the process. One or more cores may need to be dedicated simply to running the software for moving data between the various accelerators.

This can lead to substantial overhead and waste of compute resources. For example, sources of overhead may include:
1. Control and data plane in fabric software.
2. Movement of data within different memory tiers.
3. Coordination of scale-out instances performed in software.

This overhead can become a limiting factor for the overall performance of the AI system as the deep learning training models are spread across many nodes, including cores and accelerator devices. The overhead also taxes the limited power and thermal capacities of each node, because CPUs and accelerator devices both need to keep running to perform the deep learning training and the communication tasks that flow from the training.

Some existing solutions provide optimizations that are conscious of system configuration to reduce the communication and coordination that is necessary in the deep learning training system. For example, these may strive to reduce communication, even sometimes at the expense of data parallelism. Some software solutions may also focus on background memory management, which controls the movement of data between CPUs and GPUs, thereby optimizing execution performance. Other solutions introduce parameter servers to simplify the data exchange and synchronization steps between the different nodes. These may be read and written by all applications during a coordination step. In this approach, performance of training becomes dependent on the parameter server implementation.

In these cases, coordination in scale-out approaches is limited by scalability. Furthermore, configuration-conscious optimizations are error-prone, difficult to validate, and may require trial and error, ultimately leading to compromises or trade-offs that need to be revisited as problem sizes and system configurations change. Furthermore, while these solutions provide some benefits, they do not avoid data transfer between different memory tiers.

In some cases, these existing solutions also do not address the communication difficulties inherent in the problem. For example, it may be difficult to employ these approaches in the context of edge cloud computing appliances, where the resources available to the tenants (e.g., in the form of regular computing cores) are limited. Thus, the overhead factors are difficult to mitigate by mixing hardware accelerators (such as Intel® Lake Crest) with existing compute systems such as ordinary x86 processors. This can create multitenancy challenges as well, since what each tenant has available to it is limited. Thus, while some nodes may have surplus acceleration capacity, others may lack the necessary CPU cycles available to the tenant so that the tenant can benefit from tapping that capacity. Ultimately, such software stack mediated communications are vulnerable to "siloing."

It is possible, however, to address the limitations of software stack mediated communications between accelerators by extending the accelerators themselves. Embodiments of the present specification extend the accelerator inter-chip link (ICL), for example the Lake Crest ICL, which provides the communication logic between AI appliances within a platform. These extensions may provide novel logic for transparent connections with an inter-device communication protocol at data center or multiple data center-level connected appliances via a secure wide area network (WAN). Transparency of communication may be achieved by programming the routing and forwarding into a novel system decoder element that may be provided on the accelerator itself. The system decoder may be provided in any appropriate form. For example, if the accelerator is a GPU, the system decoder may be provided in a read-only memory (ROM) or firmware, or may be provided as a coprocessor, ASIC, FPGA, or other logic device that provides the system decoder functions described in this specification. The system decoder described herein achieves communication between devices within the same physical chassis (which may be referred to as a "drawer" or "capsule") via a platform ICL, and further provides a new inter-platform fabric ICL that is configured to natively tunnel inter-device protocol traffic via an inter-chassis fabric, such as Intel® Omni-Path, Ethernet, or some other data center fabric. Thus, the transparency of communication extends seamlessly to other devices that are situated in different platform units such as different racks, drawers, capsules, or even in different data centers.

This enables establishing a connection between any grouping of AI appliances that are joined together, while abstracting out the details such as what type of physical and network channel exists between them, so that computational logic in the appliances can work seamlessly as if operating within an arbitrarily large, scaled-up instance as necessary. It may also operate within scaled-down or disaggregated instances, when the need goes away for high-bandwidth inter-device communication. A relatively small amount of programmable logic (such as in an FPGA) may allow extensible support for multiple communication protocols to make the architecture easier to evolve and to keep it easily immersible across different data centers, clouds, and fog designs.

Advantageously, the system decoder of the present specification enables transparent coordination between accelerators without having to transit data flows between them through other memory tiers, such as up through main memory, and without requiring CPUs to intervene to perform cross-platform transfers. This enables faster synchronization, streamlined data exchanges, and faster execution times on training data sets. It also provides advantages relative to existing high-speed links between GPUs or FPGAs. Unlike those existing high-speed links, which operate within a single physical platform, the system agent of the present specification provides for scalable compositions of distributed acceleration assets and scaled-up and scaled-down deployments on a dynamic basis across multiple drawers, modules, racks, or even data centers.

The system decoder described herein provides beneficial capabilities that permit dynamic composition of devices in an AI application with low latency sharing of data among the devices. The system decoder extends the current architecture to achieve elastic scale-up and scale-out of available components to achieve high throughput and low latency pipelines or functions.

An extended ICL added to the hardware accelerator platform may include the following components.

A system and method for a system decoder for training accelerators will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a block diagram of selected components of a data center with connectivity to network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

In this illustration, workload clusters 118 are shown as modular workload clusters conforming to the rack unit ("U") standard, in which a standard rack, 19 inches wide, may be built to accommodate 42 units (42 U), each 1.75 inches high and approximately 36 inches deep. In this case, compute resources such as processors, memory, storage, accelerators, and switches may fit into some multiple of rack units from one to 42.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such as where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® Omni-Path™, TrueScale™, Ultra Path Interconnect (UPI) (formerly called QPI or KTI), FibreChannel, Ethernet, Fibre-Channel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as Omni-Path™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
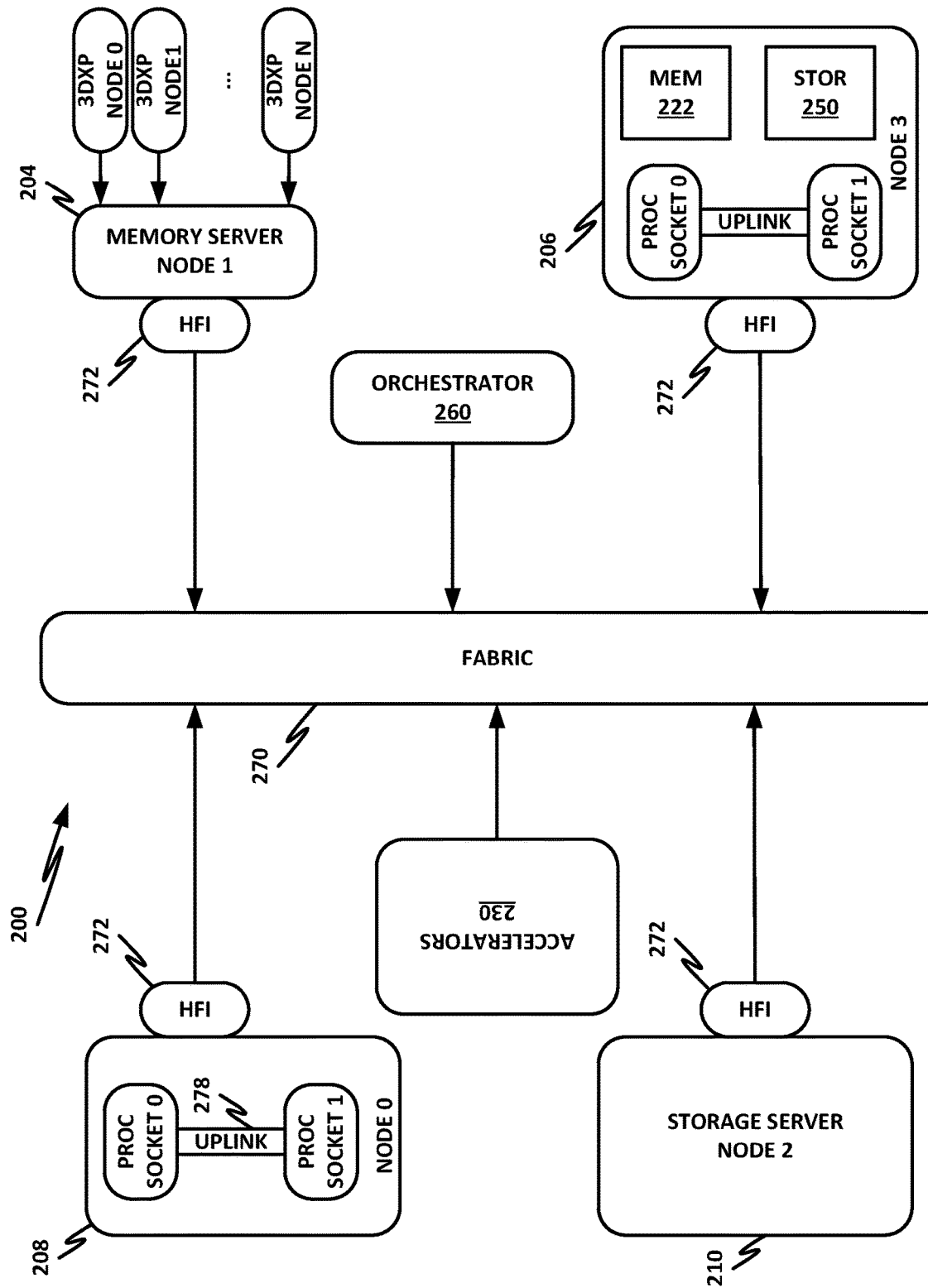
FIG. 2 is a block diagram of selected components of an end-user computing device, according to one or more examples of the present specification.

FIG. 2 is a block diagram of an end-user computing device 200, according to one or more examples of the present specification.

In this example, a fabric 270 is provided to interconnect various aspects of computing device 200. Fabric 270 may be the same as fabric 170 of FIG. 1, or may be a different fabric. As above, fabric 270 may be provided by any suitable interconnect technology. In this example, Intel® Omni-Path™ is used as an illustrative and nonlimiting example.

As illustrated, computing device 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via an HFI 272. HFI 272 may connect to an Intel® Omni-Path™ fabric. In some examples, communication with fabric 270 may be tunneled, such as by providing UPI tunneling over Omni-Path™.

Because computing device 200 may provide many functions in a distributed fashion that in previous generations were provided onboard, a highly capable HFI 272 may be provided. HFI 272 may operate at speeds of multiple gigabits per second, and in some cases may be tightly coupled with node 0 208. For example, in some embodiments, the logic for HFI 272 is integrated directly with the processors on a system-on-a-chip. This provides very high speed communication between HFI 272 and the processor sockets, without the need for intermediary bus devices, which may introduce additional latency into the fabric. However, this is not to imply that embodiments where HFI 272 is provided over a traditional bus are to be excluded. Rather, it is expressly anticipated that in some examples, HFI 272 may be provided on a bus, such as a PCIe bus, which is a serialized version of PCI that provides higher speeds than traditional PCI. Throughout computing device 200, various nodes may provide different types of HFIs 272, such as onboard HFIs and plug-in HFIs. It should also be noted that certain blocks in a system on a chip may be provided as intellectual property (IP) blocks that can be "dropped" into an integrated circuit as a modular unit. Thus, HFI 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via an HFI 272, which provides fast communication that makes these technologies possible.

By way of further illustration, node 3 206 is also depicted. Node 3 206 also includes an HFI 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

Computing device 200 may also include accelerators 230. These may provide various accelerated functions, including hardware or coprocessor acceleration for functions such as packet processing, encryption, decryption, compression, decompression, network security, or other accelerated functions in the data center. In some examples, accelerators 230 may include deep learning accelerators that may be directly attached to one or more cores in nodes such as node 0 208 or node 3 206. Examples of such accelerators can include, by way of nonlimiting example, Intel® QuickData Technology (QDT), Intel® QuickAssist Technology (QAT), Intel® Direct Cache Access (DCA), Intel® Extended Message Signaled Interrupt (MSI-X), Intel® Receive Side Coalescing (RSC), and other acceleration technologies.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation.

Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
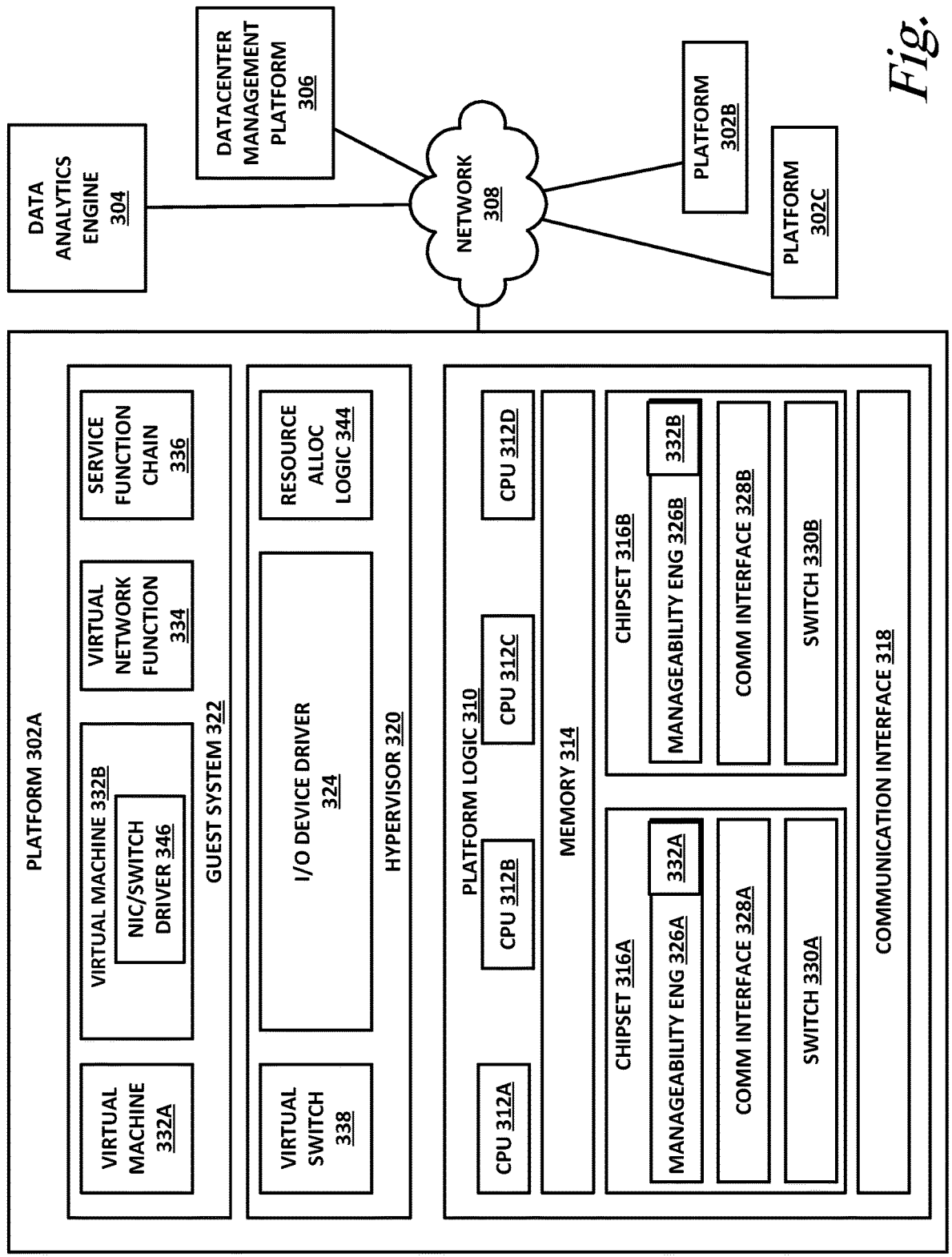
FIG. 3 is a block diagram of components of a computing platform, according to one or more examples of the present specification.

FIG. 3 illustrates a block diagram of components of a computing platform 302A according to one or more examples of the present specification. In the embodiment depicted, platforms 302A, 302B, and 302C, along with a data center management platform 306 and data analytics engine 304 are interconnected via network 308. In other embodiments, a computer system may include any suitable number of (i.e., one or more) platforms. In some embodiments (e.g., when a computer system only includes a single platform), all or a portion of the system management platform 306 may be included on a platform 302. A platform 302 may include platform logic 310 with one or more central processing units (CPUs) 312, memories 314 (which may include any number of different modules), chipsets 316, communication interfaces 318, and any other suitable hardware and/or software to execute a hypervisor 320 or other operating system capable of executing workloads associated with applications running on platform 302. In some embodiments, a platform 302 may function as a host platform for one or more guest systems 322 that invoke these applications. Platform 302A may represent any suitable computing environment, such as a high performance computing environment, a data center, a communications service provider infrastructure (e.g., one or more portions of an Evolved Packet Core), an in-memory computing environment, a computing system of a vehicle (e.g., an automobile or airplane), an Internet of Things environment, an industrial control system, other computing environment, or combination thereof.

In various embodiments of the present disclosure, accumulated stress and/or rates of stress accumulated of a plurality of hardware resources (e.g., cores and uncores) are monitored and entities (e.g., system management platform 306, hypervisor 320, or other operating system) of computer platform 302A may assign hardware resources of platform logic 310 to perform workloads in accordance with the stress information. In some embodiments, self-diagnostic capabilities may be combined with the stress monitoring to more accurately determine the health of the hardware resources. Each platform 302 may include platform logic 310. Platform logic 310 comprises, among other logic enabling the functionality of platform 302, one or more CPUs 312, memory 314, one or more chipsets 316, and communication interfaces 328. Although three platforms are illustrated, computer platform 302A may be interconnected with any suitable number of platforms. In various embodiments, a platform 302 may reside on a circuit board that is installed in a chassis, rack, or other suitable structure that comprises multiple platforms coupled together through network 308 (which may comprise, e.g., a rack or backplane switch).

CPUs 312 may each comprise any suitable number of processor cores and supporting logic (e.g., uncores). The cores may be coupled to each other, to memory 314, to at least one chipset 316, and/or to a communication interface 318, through one or more controllers residing on CPU 312 and/or chipset 316. In particular embodiments, a CPU 312 is embodied within a socket that is permanently or removably coupled to platform 302A. Although four CPUs are shown, a platform 302 may include any suitable number of CPUs.

Memory 314 may comprise any form of volatile or nonvolatile memory including, without limitation, magnetic media (e.g., one or more tape drives), optical media, random access memory (RAM), read-only memory (ROM), flash memory, removable media, or any other suitable local or remote memory component or components. Memory 314 may be used for short, medium, and/or long term storage by platform 302A. Memory 314 may store any suitable data or information utilized by platform logic 310, including software embedded in a computer readable medium, and/or encoded logic incorporated in hardware or otherwise stored (e.g., firmware). Memory 314 may store data that is used by cores of CPUs 312. In some embodiments, memory 314 may also comprise storage for instructions that may be executed by the cores of CPUs 312 or other processing elements (e.g., logic resident on chipsets 316) to provide functionality associated with the manageability engine 326 or other components of platform logic 310. A platform 302 may also include one or more chipsets 316 comprising any suitable logic to support the operation of the CPUs 312. In various embodiments, chipset 316 may reside on the same die or package as a CPU 312 or on one or more different dies or packages. Each chipset may support any suitable number of CPUs 312. A chipset 316 may also include one or more controllers to couple other components of platform logic 310 (e.g., communication interface 318 or memory 314) to one or more CPUs. In the embodiment depicted, each chipset 316 also includes a manageability engine 326. Manageability engine 326 may include any suitable logic to support the operation of chipset 316. In a particular embodiment, a manageability engine 326 (which may also be referred to as an innovation engine) is capable of collecting real-time telemetry data from the chipset 316, the CPU(s) 312 and/or memory 314 managed by the chipset 316, other components of platform logic 310, and/or various connections between components of platform logic 310. In various embodiments, the telemetry data collected includes the stress information described herein.

In various embodiments, a manageability engine 326 operates as an out-of-band asynchronous compute agent which is capable of interfacing with the various elements of platform logic 310 to collect telemetry data with no or minimal disruption to running processes on CPUs 312. For example, manageability engine 326 may comprise a dedicated processing element (e.g., a processor, controller, or other logic) on chip set 316, which provides the functionality of manageability engine 326 (e.g., by executing software instructions), thus conserving processing cycles of CPUs 312 for operations associated with the workloads performed by the platform logic 310. Moreover the dedicated logic for the manageability engine 326 may operate asynchronously with respect to the CPUs 312 and may gather at least some of the telemetry data without increasing the load on the CPUs.

A manageability engine 326 may process telemetry data it collects (specific examples of the processing of stress information will be provided herein). In various embodiments, manageability engine 326 reports the data it collects and/or the results of its processing to other elements in the computer system, such as one or more hypervisors 320 or other operating systems and/or system management software (which may run on any suitable logic such as system management platform 306). In particular embodiments, a critical event such as a core that has accumulated an excessive amount of stress may be reported prior to the normal interval for reporting telemetry data (e.g., a notification may be sent immediately upon detection).

Additionally, manageability engine 326 may include programmable code configurable to set which CPU(s) 312 a particular chipset 316 will manage and/or which telemetry data will be collected.

Chipsets 316 also each include a communication interface 328. Communication interface 328 may be used for the communication of signaling and/or data between chipset 316 and one or more I/O devices, one or more networks 308, and/or one or more devices coupled to network 308 (e.g., system management platform 306). For example, communication interface 328 may be used to send and receive network traffic such as data packets. In a particular embodiment, a communication interface 328 comprises one or more physical network interface controllers (NICs), also known as network interface cards or network adapters. A NIC may include electronic circuitry to communicate using any suitable physical layer and data link layer standard such as Ethernet (e.g., as defined by a IEEE 802.3 standard), Fibre Channel, InfiniBand, Wi-Fi, or other suitable standard. A NIC may include one or more physical ports that may couple to a cable (e.g., an Ethernet cable). A NIC may enable communication between any suitable element of chipset 316 (e.g., manageability engine 326 or switch 330) and another device coupled to network 308. In various embodiments a NIC may be integrated with the chipset (i.e., may be on the same integrated circuit or circuit board as the rest of the chipset logic) or may be on a different integrated circuit or circuit board that is electromechanically coupled to the chipset.

In particular embodiments, communication interfaces 328 may allow communication of data (e.g., between the manageability engine 326 and the data center management platform 306) associated with management and monitoring functions performed by manageability engine 326. In various embodiments, manageability engine 326 may utilize elements (e.g., one or more NICs) of communication interfaces 328 to report the telemetry data (e.g., to system management platform 306) in order to reserve usage of NICs of communication interface 318 for operations associated with workloads performed by platform logic 310.

Switches 330 may couple to various ports (e.g., provided by NICs) of communication interface 328 and may switch data between these ports and various components of chipset 316 (e.g., one or more Peripheral Component Interconnect Express (PCIe) lanes coupled to CPUs 312). Switches 330 may be a physical or virtual (i.e., software) switch.

Platform logic 310 may include an additional communication interface 318. Similar to communication interfaces 328, communication interfaces 318 may be used for the communication of signaling and/or data between platform logic 310 and one or more networks 308 and one or more devices coupled to the network 308. For example, communication interface 318 may be used to send and receive network traffic such as data packets. In a particular embodiment, communication interfaces 318 comprise one or more physical NICs. These NICs may enable communication between any suitable element of platform logic 310 (e.g., CPUs 312 or memory 314) and another device coupled to network 308 (e.g., elements of other platforms or remote computing devices coupled to network 308 through one or more networks).

Platform logic 310 may receive and perform any suitable types of workloads. A workload may include any request to utilize one or more resources of platform logic 310, such as one or more cores or associated logic. For example, a workload may comprise a request to instantiate a software component, such as an I/O device driver 324 or guest system 322; a request to process a network packet received from a virtual machine 332 or device external to platform 302A (such as a network node coupled to network 308); a request to execute a process or thread associated with a guest system 322, an application running on platform 302A, a hypervisor 320 or other operating system running on platform 302A; or other suitable processing request.

A virtual machine 332 may emulate a computer system with its own dedicated hardware. A virtual machine 332 may run a guest operating system on top of the hypervisor 320. The components of platform logic 310 (e.g., CPUs 312, memory 314, chipset 316, and communication interface 318) may be virtualized such that it appears to the guest operating system that the virtual machine 332 has its own dedicated components.

A virtual machine 332 may include a virtualized NIC (vNIC), which is used by the virtual machine as its network interface. A vNIC may be assigned a media access control (MAC) address or other identifier, thus allowing multiple virtual machines 332 to be individually addressable in a network.

VNF 334 may comprise a software implementation of a functional building block with defined interfaces and behavior that can be deployed in a virtualized infrastructure. In particular embodiments, a VNF 334 may include one or more virtual machines 332 that collectively provide specific functionalities (e.g., wide area network (WAN) optimization, virtual private network (VPN) termination, firewall operations, load-balancing operations, security functions, etc.). A VNF 334 running on platform logic 310 may provide the same functionality as traditional network components implemented through dedicated hardware. For example, a VNF 334 may include components to perform any suitable NFV workloads, such as virtualized evolved packet core (vEPC) components, mobility management entities, 3rd Generation Partnership Project (3GPP) control and data plane components, etc.

SFC 336 is a group of VNFs 334 organized as a chain to perform a series of operations, such as network packet processing operations. Service function chaining may provide the ability to define an ordered list of network services (e.g. firewalls, load balancers) that are stitched together in the network to create a service chain.

A hypervisor 320 (also known as a virtual machine monitor) may comprise logic to create and run guest systems 322. The hypervisor 320 may present guest operating systems run by virtual machines with a virtual operating platform (i.e., it appears to the virtual machines that they are running on separate physical nodes when they are actually consolidated onto a single hardware platform) and manage the execution of the guest operating systems by platform logic 310. Services of hypervisor 320 may be provided by virtualizing in software or through hardware assisted resources that require minimal software intervention, or both. Multiple instances of a variety of guest operating systems may be managed by the hypervisor 320. Each platform 302 may have a separate instantiation of a hypervisor 320.

Hypervisor 320 may be a native or bare-metal hypervisor that runs directly on platform logic 310 to control the platform logic and manage the guest operating systems.

Alternatively, hypervisor 320 may be a hosted hypervisor that runs on a host operating system and abstracts the guest operating systems from the host operating system. Hypervisor 320 may include a virtual switch 338 that may provide virtual switching and/or routing functions to virtual machines of guest systems 322. The virtual switch 338 may comprise a logical switching fabric that couples the vNICs of the virtual machines 332 to each other, thus creating a virtual network through which virtual machines may communicate with each other.

Virtual switch 338 may comprise a software element that is executed using components of platform logic 310. In various embodiments, hypervisor 320 may be in communication with any suitable entity (e.g., a SDN controller) which may cause hypervisor 320 to reconfigure the parameters of virtual switch 338 in response to changing conditions in platform 302 (e.g., the addition or deletion of virtual machines 332 or identification of optimizations that may be made to enhance performance of the platform).

Hypervisor 320 may also include resource allocation logic 344, which may include logic for determining allocation of platform resources based on the telemetry data (which may include stress information). Resource allocation logic 344 may also include logic for communicating with various components of platform logic 310 entities of platform 302A to implement such optimization, such as components of platform logic 310.

Any suitable logic may make one or more of these optimization decisions. For example, system management platform 306; resource allocation logic 344 of hypervisor 320 or other operating system; or other logic of computer platform 302A may be capable of making such decisions. In various embodiments, the system management platform 306 may receive telemetry data from and manage workload placement across multiple platforms 302. The system management platform 306 may communicate with hypervisors 320 (e.g., in an out-of-band manner) or other operating systems of the various platforms 302 to implement workload placements directed by the system management platform.

The elements of platform logic 310 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, or a Gunning transceiver logic (GTL) bus.

Elements of the computer platform 302A may be coupled together in any suitable manner such as through one or more networks 308. A network 308 may be any suitable network or combination of one or more networks operating using one or more suitable networking protocols. A network may represent a series of nodes, points, and interconnected communication paths for receiving and transmitting packets of information that propagate through a communication system. For example, a network may include one or more firewalls, routers, switches, security appliances, antivirus servers, or other useful network devices.

Figure 4:
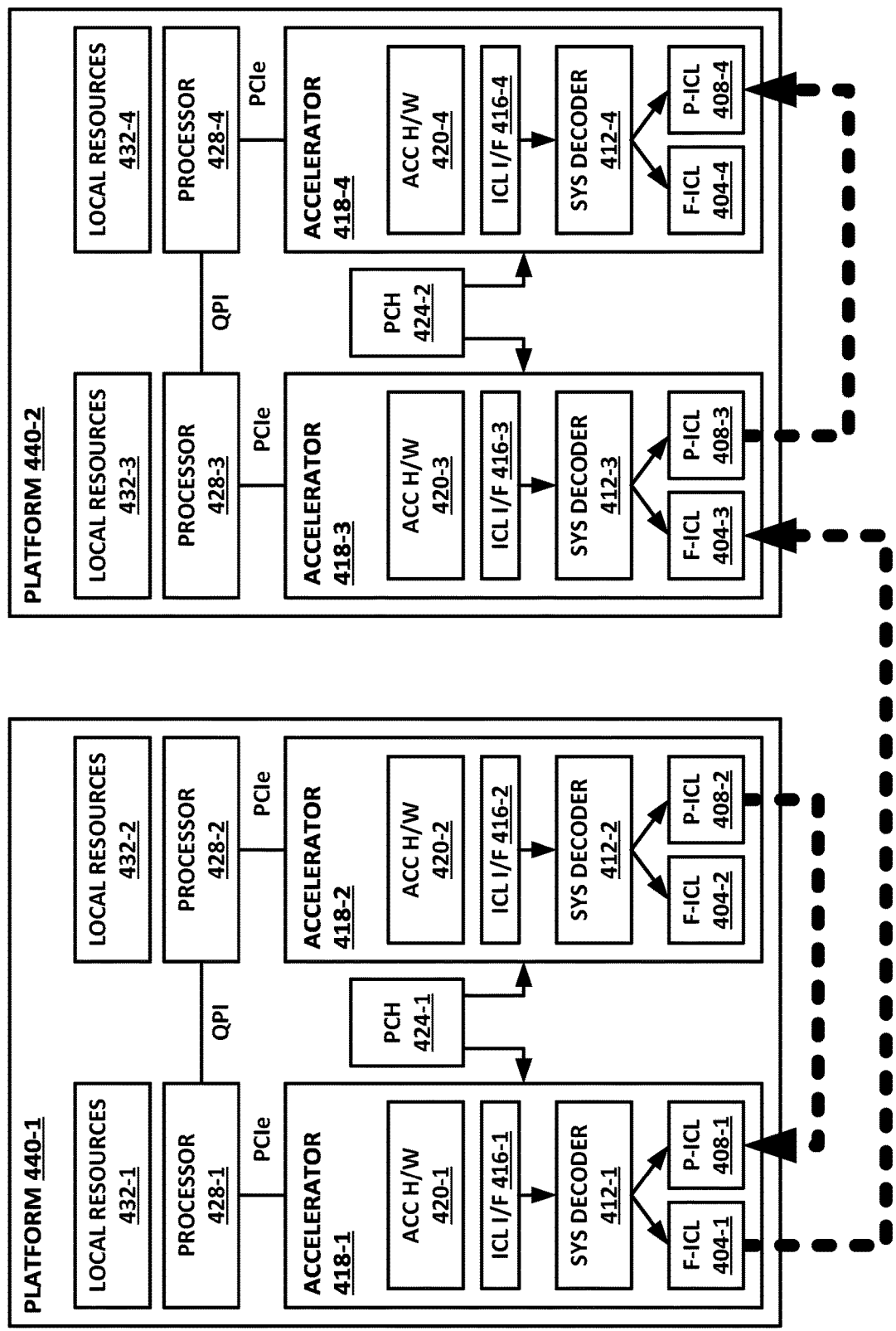
FIG. 4 is a block diagram of an AI system including two platforms, according to one or more examples of the present specification.

FIG. 4 is a block diagram of an AI system including two platforms, namely platform 440-1 and platform 440-2.

Each platform 440 includes, for example, one or more processors 428, which may be connected to each other via a local interconnect technology such as Intel® QuickPath Interconnect (QPI) or similar. For example, platform 440-1 includes processor 428-1 and processor 428-2 connected via a QPI interconnect. Each processor 428 may also have access to its own local resources 432. For example, processor 428-1 has access to local resources 432-1 and processor 428-2 has access to local resources 432-2. Local resources 432 may include, for example, a network interface card, a host fabric interface, memory, storage, or similar. Note that in this illustration, each processor 428 is shown as having access to its own local resources, but it should be understood that one or more local resources 432 may be shared by processors 428. The allocation of local resources as dedicated local resources to a processor or shared local resources between multiple processors is an exercise of ordinary engineering skill.

In this example, platform 440-1 also includes accelerators 418-1 and accelerator 418-2. Note that in this example, each processor 428 includes its own dedicated accelerator 418. For example, processor 428-1 has dedicated accelerator 418-1, while processor 428-2 includes dedicated accelerator 418-2. Processors 428 may be interconnected with each other via a known interconnect, such as PCIe. Note that PCIe is not a cache-coherent or memory-coherent interconnect. In other words, in certain existing implementations of PCIe, accelerator 418 cannot directly map its local memory space to the memory space of processor 428. Thus, for data to be exchanged between accelerator 418 and processor 428, a CPU may need to operate the PCIe interconnect to move data back and forth.

Each accelerator 418 may include, by way of nonlimiting example, accelerator hardware 420, ICL interface 416, a system decoder 412, a fabric ICL 404, and a platform ICL 408. Accelerator hardware 420 may be, for example, an FPGA or a GPU, and may be programmed with a deep learning model. As used in this specification, an accelerator hardware programmed to perform a training task may be referred to as a "deep learning module," which may be understood to include both the hardware that provides the processing power, and the programming that provides the accelerator hardware with the deep learning model. The deep learning model may be the same across platforms 440-1 and platform 440-2 if both platforms are working on the same AI problem. Platform 440-1 also includes a platform control host (PCH) 424-1 that provides platform control between accelerator 418-1 and accelerator 418-2.

Note that platform 440-2 is substantially similar to and possibly even identical to platform 440-1. Platform 440-2 includes local resources 432-3 provided to processor 428-3 and local resources 432-4 provided to processor 428-4. Processor 428-3 and processor 428-4 may be communicatively coupled via a local interconnect such as QPI. Processors 428-3 and 428-4 also each have a respective accelerator, namely accelerator 418-3 and accelerator 418-4. As with platform 440-1, platform 440-2 includes a PCH 424-2.

Platform 440-1 and platform 440-2 may be coupled to each other via a fast interconnect, such as Intel Omni-Path or a high-speed Ethernet or any other suitable high-speed interconnect. However, in existing systems, there may be no mechanism for accelerators on platform 440-1 to communicate directly with accelerators on platform 440-2.

Embodiments of the present specification provide system decoder 412, such as system decoder 412-1 of accelerator 418-1, system decoder 412-2 of accelerator 418-2, system decoder 412-3 of accelerator 418-3, and system decoder 412-4 of accelerator 418-4. System decoders 412 are provided to route data from one training model instance to another. In other words, system decoder 412 defines paths among the various accelerators 418 and routes data through them as they arrive in a device.

When a training model is started within accelerator hardware 420 of an accelerator 418, new training instances in the different accelerators 418 are created. The system decoder 412 of each accelerator 418 may be programmed with the necessary information about which model is scheduled on which accelerator 418. Thus, each system decoder 412 knows which models are running on which hardware device so that it can make routing decisions. System decoder 412 may also use, for example, a small table to perform lookups. It could also maintain a table in system memory or a portion thereof that is accessible to it. The system decoder may also place routing information as header data on a packet to ensure that system decoders on other accelerators 418 forward the data appropriately.

Platform ICL 408 implements a link protocol between different accelerator devices within the same platform. This can be accomplished without the necessity of communicating via the data center fabric. For example, operating platform ICL 408-1, accelerator 418-1 can communicate directly with accelerator 418-2 via platform ICL 408-2. However, accelerator 418-1 may not be able to communicate directly with accelerator 418-3 or accelerator 418-4 via platform ICL 408. System decoder 412 may operate platform ICLs 408 when moving data to a particular model training instance from one accelerator to another within the same chassis or capsule, in this case within platform 440-1 or within platform 440-2.

Fabric ICL 404 provides communication between accelerators 418 on different platforms 440. Fabric ICL 404 may be, for example, an FPGA or other accelerated hardware. Fabric ICL 404 is used by system decoder 412 and implements the protocol for use when communication is between acceleration devices hosted in different platforms 440. In FIG. 4, for example, fabric ICL 404 is operated in a computation that needs to occur in accelerator 418-1 on platform 440-1 with data sent to accelerator 418-4 on platform 440-2. Because the actual communication occurs via the inter-platform fabric that is also used by the CPU and other platform components, the communication protocol for over-the-fabric communications between accelerators 418 may be implemented in programmable logic such as an FPGA. Fabric ICL 404 may provide tunneling of packets destined for other accelerators 418 on different platforms 440.

Note that the actual order of communications may be based on the specifics of the configuration. For example, in some existing systems, accelerators 418 communicate in a round-robin fashion, in which case, if there are multiple accelerators 418 on a platform 440, then one accelerator 418 may be designated by the system decoder 412 as a "gateway" device to other accelerators on the platform 440. Note that in this illustration, for simplicity, only two processors 428 with one accelerator 418 each are shown on each platform 440. However, in real world deployments, there may be many processors with many accelerators, so that communications can be more complicated.

In one example, accelerator 418-2 may generate data that need to be passed to accelerator 418-4. In this case, accelerators 418-1 and 418-3 may be designated as the "gateway" devices for their respective platforms 440. Thus, system decoder 412-2 does not operate its fabric ICL 404-2 to communicate directly with fabric ICL 404-4 of accelerator 418-4. Rather, system decoder 412-2 may first operate platform ICL 408-2 to pass the data to accelerator 418-1 via platform ICL 408-1. System decoder 412-1 may then operate fabric ICL 404-1 to pass the data to fabric ICL 404-3 of accelerator 418-3. System decoder 412-3 then operates platform ICL 408-3 to pass the data to accelerator 418-4 via platform ICL 418-4.

Figure 5:
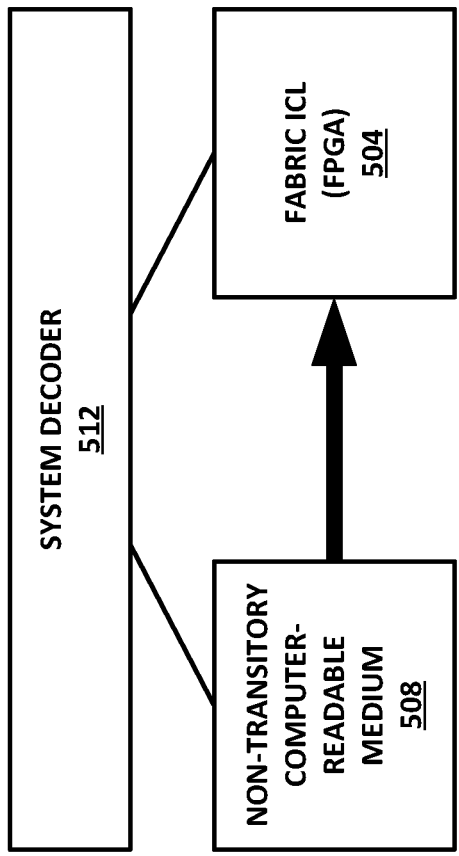
FIG. 5 is a block diagram of a system decoder, according to one or more examples of the present specification.

FIG. 5 is a block diagram of a system decoder 512, according to one or more examples of the present specification. As noted in connection with FIG. 4, a fabric ICL, such as fabric ICL 504 disclosed in this illustration, may be an FPGA or other programmable logic such as a GPU, DSP, coprocessor, or other programmable logic device. When the system is started, system decoder 512 may determine the appropriate role for fabric ICL 504 within the system. Thus, system decoder 512 may need to program fabric ICL 504 with the appropriate routing tables, behavior, and other information to carry out the specified routing protocol. This could include, for example, designating particular routes for broadcast traffic or point-to-point traffic, by way of nonlimiting example. As discussed in connection with FIG. 4, in the case of broadcast traffic, one fabric ICL 504 on the platform may be designated as the gateway device for all accelerators on the platform. In the case of point-to-point communications, each fabric ICL 504 on a particular accelerator may interconnect with other fabric ICLs via the network fabric. Fabric ICLs 504 may also connect to each other in a round-robin or mesh network configuration, or any other configuration suitable to the needs of a particular deployment. Thus, in many instances, fabric ICL 504 may benefit from having the flexibility of being adaptable to the specific network configuration. Furthermore, fabric ICL 504 may need to be able to adapt to changing network conditions. For example, the fabric ICL 504 on a particular platform that is used as a gateway in instances where a single fabric ICL is designated as the gateway may be dynamically allocated depending on network traffic conditions. For example, system decoder 512 may calculate the network cost associated with using different fabric ICLs 504 as the gateway device, or may compare the network cost of using a gateway device as opposed to using point-to-point or mesh connections.

System decoder 512 may have access to one or more tangible, non-transitory computer readable mediums 508, which may have stored thereon computer operable instructions to carry out the methods disclosed herein. This could include, by way of nonlimiting example, executable software instructions for execution on a GPU, CPU, DSP, or other programmable logic device. This could also include instructions for programming an FPGA with the appropriate routing information. In some examples, this could also include instructions or masks for programming an ASIC with the appropriate routing.

Thus, upon system startup, or some other appropriate time, system decoder 512 or some other appropriate system as dictated by the embodiment may access non-transitory computer readable medium 508, and may use information thereon to program fabric ICL 504 with the appropriate routing configuration. Note that non-transitory computer readable medium 508 may include a number of stock configurations from which system decoder 512 can select the appropriate configuration for the present network demands, or it may include more complicated algorithms for crafting a highly specialized configuration for the particular network need.

Figure 6:
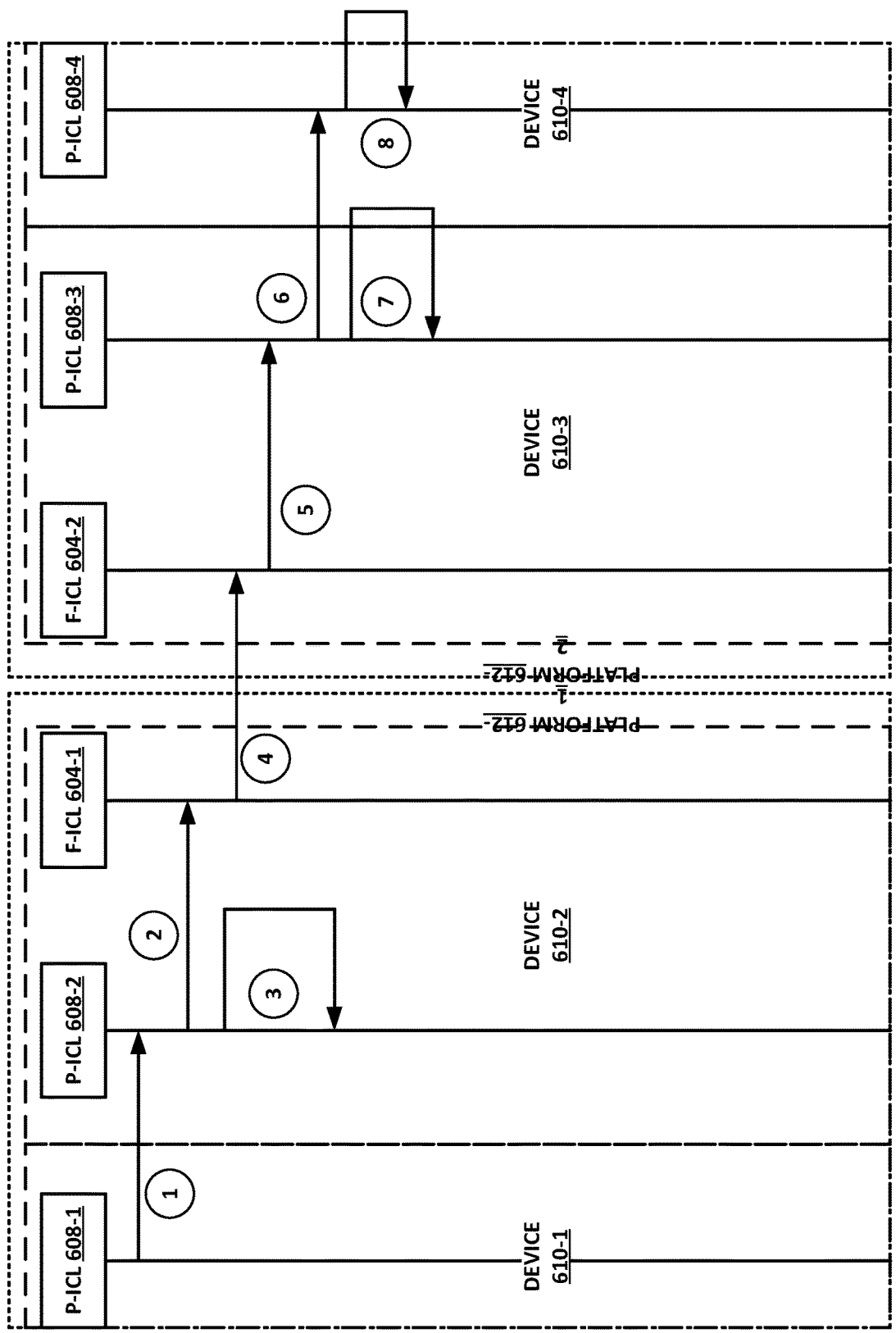
FIG. 6 is a signal flow diagram illustrating an example broadcast message, according to one or more examples of the present specification.

FIG. 6 is a signal flow diagram illustrating an example broadcast message, according to one or more examples of the present specification. In this example, four accelerator devices are illustrated, namely device 610-1, device 610-2, device 610-3, and device 610-4. Device 610-1 and device 610-2 are both hosted on platform 612-1. Device 610-3 and 610-4 are both hosted on platform 612-2.

In this illustrative embodiment, fabric ICL 604-1 is designated as the gateway fabric ICL for platform 612-1, for broadcast purposes. Fabric ICL 604-2 is designated as the gateway fabric ICL for platform 612-2, for broadcast purposes.

Device 610-1 may compute a datum that is to be broadcast to some or all accelerators in the system. For purposes of this illustration, the datum computed by device 610-1 is to be broadcast to at least device 610-2, device 610-3, and device 610-4. Note, however, that it may be necessary to broadcast the datum to other devices, and the embodiment illustrated herein should be understood to be nonlimiting and illustrative only.

At operation 1, the system decoder of device 610-1 first may distribute the datum to all devices on platform 612-1. Because the system decoder of device 610-1 knows that its own fabric ICL is not the gateway fabric ICL for broadcast purposes on this platform, device 610-1 need take no further action. As part of broadcasting the datum to all devices on platform 612-1, platform ICL 608-1 communicates the datum to other platform ICLs on platform 612-1, including to platform ICL 608-2.

At operation 2, the system decoder of device 610-2 determines that fabric ICL 604-1 is the designated gateway fabric ICL for platform 612-1. Thus, platform ICL 608-2 transfers the datum to fabric ICL 604-1.

At operation 3, device 610-2 consumes the datum and performs any work needed to be performed on the datum.

At operation four, because fabric ICL 604-1 is the designated gateway fabric ICL for fabric 612-1, fabric ICL 604-1 transmits the datum to fabric ICL 604-2 of platform 612-2. Note that there may be a number of other platforms within the AI system, and in that case, fabric ICL 604-1 may broadcast the datum to a plurality of fabric ICLs on a plurality of platforms.

At operation 5, fabric ICL 604-2 of device 610-3 transmits the datum to platform ICL 608-3 of device 610-3.

At operation 6, platform ICL 608-3 of device 610-3 identifies the datum as a datum to be transmitted to other devices 610 on platform 612-2. Thus, platform ICL 608-3 transmits the datum to platform ICL 608-4 of device 610-4. Platform ICL 608-3 may also broadcast the datum to other platform ICLs 608 of other devices 610 on platform 612-2.

At operation 7, device 610-3 consumes the datum and performs any work needed to be performed on the datum.

At operation 8, device 610-4 also consumes the datum and performs any work that needs to be performed on the datum.

Figure 7:
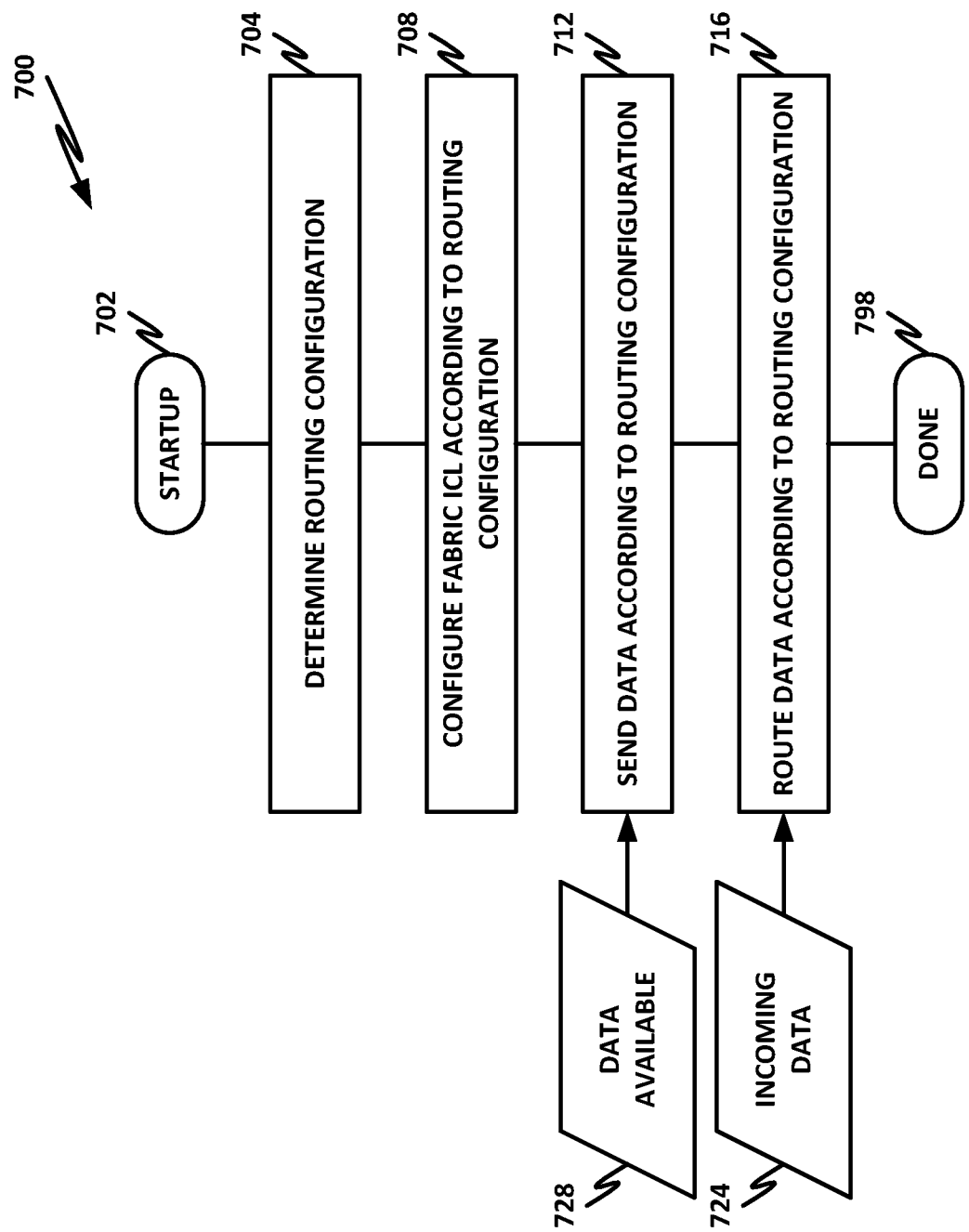
FIG. 7 is a flowchart of a method performed by a system decoder or other appropriate device, according to one or more examples of the present specification.

FIG. 7 is a flowchart of method 700 performed by a system decoder or other appropriate device, according to one or more examples of the present specification.

In block 702, the accelerator device hosting the system decoder starts up.

In block 704, the system decoder determines the necessary routing configuration for the platform and the device. This can include any appropriate routing configuration, such as a mesh, point-to-point connections, round-robin, broadcast, or other appropriate network configuration. The system decoder may interoperate and communicate with other system decoders on the platform to "elect" a gateway platform ICL in cases where a gateway is to be designated. The election of a gateway platform ICL can be performed according to any of the known methods for electing a gateway or master device.

In block 708, the system decoder configures the fabric ICL according to the routing configuration determined in block 704. In some examples, this may include reading data from a non-transitory computer readable medium such as is illustrated in FIG. 5, and programming the fabric ICL accordingly. This could include programming an FPGA or loading software to run on, for example, a coprocessor or a GPU.

In block 712, the fabric ICL determines that in block 28 there are data available for use by this fabric ICL. Thus, in block 712, the fabric ICL sends the data according to the configured routing configuration. This could include broadcasting the data out to all fabric ICLs on all platforms within the system, or it could include transmitting the data to only one fabric ICL on one other device or platform.

Similarly, at block 716, the fabric ICL determines that there are incoming data 724. These data may be incoming from other devices or platforms within the system. Thus, in block 716, the fabric ICL routes the data according to the routing configuration. This could include transmitting the data to the platform ICL local to the fabric ICL, and/or instructing the platform ICL to transmit the data to one or more other devices on the platform via the platform ICL.

In block 798, the method is done.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

In the foregoing description, certain aspects of some or all embodiments are described in greater detail than is strictly necessary for practicing the appended claims. These details are provided by way of non-limiting example only, for the purpose of providing context and illustration of the disclosed embodiments. Such details should not be understood to be required, and should not be "read into" the claims as limitations. The phrase may refer to "an embodiment" or "embodiments." These phrases, and any other references to embodiments, should be understood broadly to refer to any combination of one or more embodiments. Furthermore, the several features disclosed in a particular "embodiment" could just as well be spread across multiple embodiments. For example, if features 1 and 2 are disclosed in "an embodiment," embodiment A may have feature 1 but lack feature 2, while embodiment B may have feature 2 but lack feature 1.

This specification may provide illustrations in a block diagram format, wherein certain features are disclosed in separate blocks. These should be understood broadly to disclose how various features interoperate, but are not intended to imply that those features must necessarily be embodied in separate hardware or software. Furthermore, where a single block discloses more than one feature in the same block, those features need not necessarily be embodied in the same hardware and/or software. For example, a computer "memory" could in some circumstances be distributed or mapped between multiple levels of cache or local memory, main memory, battery-backed volatile memory, and various forms of persistent memory such as a hard disk, storage server, optical disk, tape drive, or similar.

In certain embodiments, some of the components may be omitted or consolidated. In a general sense, the arrangements depicted in the figures may be more logical in their representations, whereas a physical architecture may include various permutations, combinations, and/or hybrids of these elements. Countless possible design configurations can be used to achieve the operational objectives outlined herein. Accordingly, the associated infrastructure has a myriad of substitute arrangements, design choices, device possibilities, hardware configurations, software implementations, and equipment options.

References may be made herein to a computer-readable medium, which may be a tangible and non-transitory computer-readable medium. As used in this specification and throughout the claims, a "computer-readable medium" should be understood to include one or more computer-readable mediums of the same or different types. A computer-readable medium may include, by way of non-limiting example, an optical drive (e.g., CD/DVD/Blu-Ray), a hard drive, a solid-state drive, a flash memory, or other non-volatile medium. A computer-readable medium could also include a medium such as a read-only memory (ROM), an FPGA or ASIC configured to carry out the desired instructions, stored instructions for programming an FPGA or ASIC to carry out the desired instructions, an intellectual property (IP) block that can be integrated in hardware into other circuits, or instructions encoded directly into hardware or microcode on a processor such as a microprocessor, digital signal processor (DSP), microcontroller, or in any other suitable component, device, element, or object where appropriate and based on particular needs. A nontransitory storage medium herein is expressly intended to include any nontransitory special-purpose or programmable hardware configured to provide the disclosed operations, or to cause a processor to perform the disclosed operations.

Various elements may be "communicatively," "electrically," "mechanically," or otherwise "coupled" to one another throughout this specification and the claims. Such coupling may be a direct, point-to-point coupling, or may include intermediary devices. For example, two devices may be communicatively coupled to one another via a controller that facilitates the communication. Devices may be electrically coupled to one another via intermediary devices such as signal boosters, voltage dividers, or buffers. Mechanically-coupled devices may be indirectly mechanically coupled.

Any "module" or "engine" disclosed herein may refer to or include software, a software stack, a combination of hardware, firmware, and/or software, a circuit configured to carry out the function of the engine or module, or any computer-readable medium as disclosed above. Such modules or engines may, in appropriate circumstances, be provided on or in conjunction with a hardware platform, which may include hardware compute resources such as a processor, memory, storage, interconnects, networks and network interfaces, accelerators, or other suitable hardware. Such a hardware platform may be provided as a single monolithic device (e.g., in a PC form factor), or with some or part of the function being distributed (e.g., a "composite node" in a high-end data center, where compute, memory, storage, and other resources may be dynamically allocated and need not be local to one another).

There may be disclosed herein flow charts, signal flow diagram, or other illustrations showing operations being performed in a particular order. Unless otherwise expressly noted, or unless required in a particular context, the order should be understood to be a non-limiting example only. Furthermore, in cases where one operation is shown to follow another, other intervening operations may also occur, which may be related or unrelated. Some operations may also be performed simultaneously or in parallel. In cases where an operation is said to be "based on" or "according to" another item or operation, this should be understood to imply that the operation is based at least partly on or according at least partly to the other item or operation. This should not be construed to imply that the operation is based solely or exclusively on, or solely or exclusively according to the item or operation.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

In a general sense, any suitably-configured circuit or processor can execute any type of instructions associated with the data to achieve the operations detailed herein. Any processor disclosed herein could transform an element or an article (for example, data) from one state or thing to another state or thing. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes an artificial intelligence (AI) system, comprising: a first hardware platform; a fabric interface configured to communicatively couple the first hardware platform to a second hardware platform; a processor hosted on the first hardware platform and programmed to operate on an AI problem; and a first training accelerator, comprising: an accelerator hardware; a platform inter-chip link (ICL) configured to communicatively couple the first training accelerator to a second training accelerator on the first hardware platform without aid of the processor; a fabric ICL to communicatively couple the first training accelerator to a third training accelerator on a second hardware platform without aid of the processor; and a system decoder configured to operate the fabric ICL and platform ICL to share data of the accelerator hardware between the first training accelerator and second and third training accelerators without aid of the processor.

Example 2 includes the AI system of example 1, wherein the fabric is a non-memory-coherent fabric.

Example 3 includes the AI system of example 2, wherein the non-memory coherent fabric is a PCIe fabric.

Example 4 includes the AI system of example 1, wherein the fabric is an OmniPath fabric.

Example 5 includes the AI system of example 1, wherein the system decoder is configured to communicatively couple the first training accelerator to the third training accelerator in a point-to-point configuration.

Example 6 includes the AI system of example 1, wherein the system decoder is configured to communicatively couple the first training accelerator to the third training accelerator in a mesh configuration.

Example 7 includes the AI system of example 1, wherein the system decoder is configured to designate the fabric ICL as a gateway fabric ICL for the first hardware platform.

Example 8 includes the AI system of example 7, wherein the fabric ICL is to receive broadcast traffic from a single training accelerator of the second hardware platform.

Example 9 includes the AI system of example 7, wherein the fabric ICL is to broadcast traffic from the second training accelerator to a plurality of hardware platforms.

Example 10 includes the AI system of any of examples 1-9, wherein the fabric ICL is an application-specific integrated circuit (ASIC).

Example 11 includes the AI system of any of examples 1-9, wherein the fabric ICL is a field-programmable gate array (FPGA).

Example 12 includes the AI system of example 11, wherein the system decoder comprises a non-transitory storage medium having stored thereon instructions for configuring the fabric ICL FPGA, and wherein the system decoder is to program the fabric ICL FPGA with the instructions.

Example 13 includes the AI system of example 11, wherein the non-transitory storage medium comprises different instructions to configure the fabric ICL for a plurality of roles, and wherein the system decoder is to select a role for the fabric ICL and program the fabric ICL with the instructions for that role.

Example 14 includes a system decoder for a first training accelerator to operate on a first hardware platform, comprising: means to communicatively couple to a fabric interface configured to communicatively couple the first hardware platform to a second hardware platform; means to communicatively couple to an accelerator hardware; means to communicatively couple to a platform inter-chip link (ICL) configured to communicatively couple the first training accelerator to a second training accelerator on the first hardware platform without aid of a processor; meant to communicatively couple to a fabric ICL to communicatively couple the first training accelerator to a third training accelerator on a second hardware platform without aid of the processor; and means to operate the fabric ICL and platform ICL to share data of the accelerator hardware between the first training accelerator and second and third training accelerators without aid of the processor.

Example 15 includes the system decoder of example 14, wherein the fabric is a non-memory-coherent fabric.

Example 16 includes the system decoder of example 15, wherein the non-memory coherent fabric is a PCIe fabric.

Example 17 includes the system decoder of example 14, wherein the fabric is an OmniPath fabric.

Example 18 includes the system decoder of example 14, wherein the system decoder is configured to communicatively couple the first training accelerator to the third training accelerator in a point-to-point configuration.

Example 19 includes the system decoder of example 14, wherein the system decoder is configured to communicatively couple the first training accelerator to the third training accelerator in a mesh configuration.

Example 20 includes the system decoder of example 14, wherein the system decoder is configured to designate the fabric ICL as a gateway fabric ICL for the first hardware platform.

Example 21 includes the system decoder of example 20, wherein the fabric ICL is to receive broadcast traffic from a single training accelerator of the second hardware platform.

Example 22 includes the system decoder of example 20, wherein the fabric ICL is to broadcast traffic from the second training accelerator to a plurality of hardware platforms.

Example 23 includes the system decoder of any of examples 14-22, wherein the fabric ICL is an application-specific integrated circuit (ASIC).

Example 24 includes the system decoder of any of examples 14-22, wherein the fabric ICL is a field-programmable gate array (FPGA).

Example 25 includes the system decoder of example 24, wherein the system decoder comprises a non-transitory storage medium having stored thereon instructions for configuring the fabric ICL FPGA, and wherein the system decoder is to program the fabric ICL FPGA with the instructions.

Example 26 includes the system decoder of example 24, wherein the non-transitory storage medium comprises different instructions to configure the fabric ICL for a plurality of roles, and wherein the system decoder is to select a role for the fabric ICL and program the fabric ICL with the instructions for that role.

Example 27 includes the system decoder of any of examples 14-26, wherein the system decoder is an intellectual property (IP) block.

Example 28 includes the system decoder of any of examples 14-26, wherein the system decoder is a field-programmable gate array.

Example 29 includes the system decoder of any of examples 14-26, wherein the system decoder is a processor.

Example 30 includes a method of providing communication between a first training accelerator on a first hardware platform, a second training accelerator on the first hardware platform, and a third training accelerator on a second hardware platform, comprising: communicatively coupling to a fabric interface configured to communicatively couple the first hardware platform to the second hardware platform; communicatively coupling to an accelerator hardware of the first training accelerator; communicatively coupling to a platform inter-chip link (ICL) configured to communicatively couple the first training accelerator to a second training accelerator on the first hardware platform without aid of a processor; communicatively coupling to a fabric ICL to communicatively couple the first training accelerator to a third training accelerator on a second hardware platform without aid of the processor; and operating the fabric ICL and platform ICL to share data between the first training accelerator and second and third training accelerators without aid of the processor.

Example 31 includes the method of example 30, wherein the fabric is a non-memory-coherent fabric.

Example 32 includes the method of example 31, wherein the non-memory coherent fabric is a PCIe fabric.

Example 33 includes the method of example 30, wherein the fabric is an OmniPath fabric.

Example 34 includes the method of example 30, further comprising communicatively coupling the first training accelerator to the third training accelerator in a point-to-point configuration.

Example 35 includes the method of example 30, further comprising communicatively coupling the first training accelerator to the third training accelerator in a mesh configuration.

Example 36 includes the method of example 30, further comprising designating the fabric ICL as a gateway fabric ICL for the first hardware platform.

Example 37 includes the method of example 30, further comprising receiving broadcast traffic from a single training accelerator of the second hardware platform.

Example 38 includes the method of example 30, further comprising broadcasting traffic from the second training accelerator to a plurality of hardware platforms.

Example 39 includes a system decoder configured to perform the method of any of examples 30-38.

Example 40 includes the system decoder example 39, wherein the fabric ICL is an application-specific integrated circuit (ASIC).

Example 41 includes the system decoder of example 39, wherein the fabric ICL is a field-programmable gate array (FPGA).

Example 42 includes the system decoder of example 41, wherein the system decoder comprises a non-transitory storage medium having stored thereon instructions for configuring the fabric ICL FPGA, and wherein the system decoder is to program the fabric ICL FPGA with the instructions.

Example 43 includes the system decoder of example 41, wherein the non-transitory storage medium comprises different instructions to configure the fabric ICL for a plurality of roles, and wherein the system decoder is to select a role for the fabric ICL and program the fabric ICL with the instructions for that role.

Example 44 includes the system decoder of any of examples 39-43, wherein the system decoder is an intellectual property (IP) block.

Example 45 includes the system decoder of any of examples 39-43, wherein the system decoder is a field-programmable gate array.

Example 46 includes the system decoder of any of examples 39-43, wherein the system decoder is a processor.

The invention claimed is:

1. Accelerator hardware for use in a physical chassis of a computing platform, the physical chassis comprising multiple central processing units (CPUs), communication links, and forwarding hardware, the accelerator hardware comprising:
   at least one graphics processing unit (GPU) and at least one other GPU, the at least one GPU and the at least one other GPU being configurable to execute respective multiple virtualized instances, the respective multiple virtualized instances being configurable to generate respective data associated with execution of accelerator-related operations;
   wherein:
      when the computing platform is in operation, the at least one GPU is configurable to transfer, via the forwarding hardware, the respective data of a certain one of the respective multiple virtualized instances of the at least one GPU to another certain one of the respective multiple virtualized instances of the at least one other GPU;
      when the computing platform is in the operation, the at least one GPU is to be communicatively coupled via at least one of the communication links to at least one of the multiple CPUs;

data transfer between the at least one GPU and the at least one other GPU is to be in accordance with at least one communication protocol;
communication between the at least one GPU and the at least one of the multiple CPUs is to be in accordance with at least one other communication protocol; and
the at least one communication protocol and the at least one other communication protocol are different from each other, at least in part.

2. The accelerator hardware of claim 1, wherein:
the accelerator-related operations are associated with one or more of: multitenant cloud computing and/or deep learning.

3. The accelerator hardware of claim 1, wherein:
the communication links comprise Peripheral Component Interconnect Express links.

4. At least one non-transitory machine-readable storage medium storing instructions for being executed, at least in part, by accelerator hardware, the accelerator hardware being for use in a physical chassis of a computing platform, the physical chassis comprising multiple central processing units (CPUs), communication links, and forwarding hardware, the accelerator hardware comprising at least one graphics processing unit (GPU) and at least one other GPU, the instructions, when executed, at least in party, by the accelerator hardware resulting in performance of operations comprising:
configuring the at least one GPU and the at least one other GPU to execute respective multiple virtualized instances, the respective multiple virtualized instances being configurable to generate respective data associated with execution of accelerator-related operations;
wherein:
when the computing platform is in operation, the at least one GPU is configurable to transfer, via the forwarding hardware, the respective data of a certain one of the respective multiple virtualized instances of the at least one GPU to another certain one of the respective multiple virtualized instances of the at least one other GPU;
when the computing platform is in the operation, the at least one GPU is to be communicatively coupled via at least one of the communication links to at least one of the multiple CPUs;
data transfer between the at least one GPU and the at least one other GPU is to be in accordance with at least one communication protocol;
communication between the at least one GPU and the at least one of the multiple CPUs is to be in accordance with at least one other communication protocol; and
the at least one communication protocol and the at least one other communication protocol are different from each other, at least in part.

5. The at least one non-transitory machine-readable storage medium of claim 4, wherein:
the accelerator-related operations are associated with one or more of: multitenant cloud computing and/or deep learning.

6. The at least one non-transitory machine-readable storage medium of claim 4, wherein:
the communication links comprise Peripheral Component Interconnect Express links.

7. Computing platform comprising:
a physical chassis comprising:
multiple central processing units (CPUs);
communication links;
forwarding hardware; and
accelerator hardware comprising at least one graphics processing unit (GPU) and at least one other GPU, the at least one GPU and the at least one other GPU being configurable to execute respective multiple virtualized instances, the respective multiple virtualized instances being configurable to generate respective data associated with execution of accelerator-related operations;
wherein:
when the computing platform is in operation, the at least one GPU is configurable to transfer, via the forwarding hardware, the respective data of a certain one of the respective multiple virtualized instances of the at least one GPU to another certain one of the respective multiple virtualized instances of the at least one other GPU;
when the computing platform is in the operation, the at least one GPU is to be communicatively coupled via at least one of the communication links to at least one of the multiple CPUs;
data transfer between the at least one GPU and the at least one other GPU is to be in accordance with at least one communication protocol;
communication between the at least one GPU and the at least one of the multiple CPUs is to be in accordance with at least one other communication protocol; and
the at least one communication protocol and the at least one other communication protocol are different from each other, at least in part.

8. The computing platform of claim 7, wherein:
the accelerator-related operations are associated with one or more of: multitenant cloud computing and/or deep learning.

9. The computing platform of claim 7, wherein:
the communication links comprise Peripheral Component Interconnect Express links.

10. At least one non-transitory machine-readable storage medium storing instructions for being executed, at least in part, by a computing platform, the computing platform comprising a physical chassis, the physical chassis comprising multiple central processing units (CPUs), communication links, forwarding hardware, and accelerator hardware, the accelerator hardware comprising at least one graphics processing unit (GPU) and at least one other GPU, the instructions when executed, at least in part, by the computing platform resulting in performance of operations comprising:
configuring the at least one GPU and the at least one other GPU to execute respective multiple virtualized instances, the respective multiple virtualized instances being configurable to generate respective data associated with execution of accelerator-related operations;
wherein:
when the computing platform is in operation, the at least one GPU is configurable to transfer, via the forwarding hardware, the respective data of a certain one of the respective multiple virtualized instances of the at least one GPU to another certain one of the respective multiple virtualized instances of the at least one other GPU;
when the computing platform is in the operation, the at least one GPU is to be communicatively coupled via at least one of the communication links to at least one of the multiple CPUs;

data transfer between the at least one GPU and the at least one other GPU is to be in accordance with at least one communication protocol;

communication between the at least one GPU and the at least one of the multiple CPUs is to be in accordance with at least one other communication protocol; and the at least one communication protocol and the at least one other communication protocol are different from each other, at least in part.

11. The at least one non-transitory machine-readable storage medium of claim 10, wherein:

the accelerator-related operations are associated with one or more of: multitenant cloud computing and/or deep learning.

12. The at least one non-transitory machine-readable storage medium of claim 10, wherein:

the communication links comprise Peripheral Component Interconnect Express links.

13. Computing platform for use with accelerator hardware and at least one network, the computing platform being for use in providing, when the computing platform is in operation, at least one artificial intelligence (AI)-related service, the computing platform comprising:

a physical chassis;
at least one central processing unit (CPU) core;
physical accelerator logic;
multiple physical network interface controllers (NICs); and
forwarding hardware;
wherein:

the at least one CPU core, the accelerator hardware, the physical accelerator logic, and the multiple physical NICs are comprised in multiple circuit boards to be communicatively coupled together in the computing platform;

the multiple physical NICs are for use in network traffic communication via the at least one network;

the accelerator hardware comprises accelerator circuitry comprising field programmable gate array circuitry, the accelerator circuitry being configurable to execute multiple virtualized instances for use in association with implementation of neural network-related operations for use in association with the providing of the at least one AI-related service;

when the computing platform is in the operation, the accelerator circuitry is configurable to communicate, via at least one communication link and the forwarding hardware, with the physical accelerator logic;

the accelerator circuitry and the physical accelerator logic are to be comprised in the physical chassis;

the at least one communication link is comprised, at least in part, in the computing platform;

when the computing platform is in the operation, the physical accelerator logic is to be communicatively coupled via at least one other communication link to the at least one CPU core; and the at least one communication link and the at least one other communication link are to use respective communication protocols that are different from each other, at least in part.

14. The computing platform of claim 13, wherein:
the accelerator hardware is configurable for use in deep learning-related operations; and
the at least one AI-related service is associated, at least in part, with multitenant cloud computing.

15. At least one non-transitory machine-readable storage medium storing instructions for being executed, at least in part, by a computing platform, the computing platform being for use with accelerator hardware and at least one network, the computing platform being for use in providing, when the computing platform is in operation, at least one artificial intelligence (AI)-related service, the computing platform comprising a physical chassis, at least one central processing unit (CPU) core, physical accelerator logic, multiple physical network interface controllers (NICs), and forwarding hardware, the accelerator hardware comprising accelerator circuitry that comprises field programmable gate array circuitry, the instructions when executed, at least in part, by the computing platform resulting in performance of operations comprising:

configuring the accelerator circuitry to execute multiple virtualized instances for use in association with implementation of neural network-related operations for use in association with the providing of the at least one AI-related service;

wherein:

the at least one CPU core, the accelerator hardware, the physical accelerator logic, and the multiple physical NICs are comprised in multiple circuit boards to be communicatively coupled together in the computing platform;

the multiple physical NICs are for use in network traffic communication via the at least one network;

when the computing platform is in the operation, the accelerator circuitry is configurable to communicate, via at least one communication link and the forwarding hardware, with the physical accelerator logic;

the accelerator circuitry and the physical accelerator logic are to be comprised in the physical chassis;

the at least one communication link is comprised, at least in part, in the computing platform;

when the computing platform is in the operation, the physical accelerator logic is to be communicatively coupled via at least one other communication link to the at least one CPU core; and the at least one communication link and the at least one other communication link are to use respective communication protocols that are different from each other, at least in part.

16. The at least one non-transitory machine-readable storage medium of claim 15, wherein:

the accelerator hardware is configurable for use in deep learning-related operations; and the at least one AI-related service is associated, at least in part, with multitenant cloud computing.

17. A method implemented using a computing platform, the computing platform being for use with accelerator hardware and at least one network, the computing platform being for use in providing, when the computing platform is in operation, at least one artificial intelligence (AI)-related service, the computing platform comprising a physical chassis, at least one central processing unit (CPU) core, physical accelerator logic, multiple physical network interface controllers (NICs), and forwarding hardware, the accelerator hardware comprising accelerator circuitry that comprises field programmable gate array circuitry, the method comprising:

configuring the accelerator circuitry to execute multiple virtualized instances for use in association with implementation of neural network-related operations for use in association with the providing of the at least one AI-related service;

wherein:
- the at least one CPU core, the accelerator hardware, the physical accelerator logic, and the multiple physical NICs are comprised in multiple circuit boards to be communicatively coupled together in the computing platform;
- the multiple physical NICs are for use in network traffic communication via the at least one network;
- when the computing platform is in the operation, the accelerator circuitry is configurable to communicate, via at least one communication link and the forwarding hardware, with the physical accelerator logic;
- the accelerator circuitry and the physical accelerator logic are to be comprised in the physical chassis;
- the at least one communication link is comprised, at least in part, in the computing platform;
- when the computing platform is in the operation, the physical accelerator logic is to be communicatively coupled via at least one other communication link to the at least one CPU core; and
- the at least one communication link and the at least one other communication link are to use respective communication protocols that are different from each other, at least in part.

18. The method of claim 17, wherein:
the accelerator hardware is configurable for use in deep learning-related operations; and
the at least one AI-related service is associated, at least in part, with multitenant cloud computing.

* * * * *